United States Patent
You

(10) Patent No.: US 7,924,359 B2
(45) Date of Patent: Apr. 12, 2011

(54) BACKLIGHT UNIT AND LIQUID CRYSTAL DISPLAY DEVICE USING THE SAME

(75) Inventor: Dong Jae You, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/751,477

(22) Filed: Jan. 6, 2004

(65) Prior Publication Data

US 2004/0218113 A1    Nov. 4, 2004

(30) Foreign Application Priority Data

Apr. 30, 2003   (KR) .................. 10-2003-0027784

(51) Int. Cl.
*G02F 1/1333* (2006.01)
*G02F 1/1335* (2006.01)
*F21V 7/04* (2006.01)

(52) U.S. Cl. .............. 349/58; 349/65; 362/632
(58) Field of Classification Search ............ 349/58, 349/61–62, 64–67, 70; 362/632
See application file for complete search history.

(56) References Cited

U.S. PATENT DOCUMENTS

| | | | |
|---|---|---|---|
| 4,958,911 A * | 9/1990 | Beiswenger et al. | 349/61 |
| 6,064,455 A * | 5/2000 | Kim | 349/113 |
| 6,295,105 B1 * | 9/2001 | Lee et al. | 349/65 |
| 6,445,430 B1 * | 9/2002 | Sakamoto et al. | 349/62 |
| 7,160,019 B1 * | 1/2007 | Kawakami | 362/632 |
| 2001/0003471 A1 * | 6/2001 | Lee et al. | 349/58 |
| 2001/0053073 A1 * | 12/2001 | Itoh et al. | 362/31 |
| 2002/0167626 A1 * | 11/2002 | Matsuda et al. | 349/65 |
| 2003/0053008 A1 * | 3/2003 | Nakano | 349/65 |
| 2003/0223020 A1 * | 12/2003 | Lee | 349/58 |
| 2004/0061813 A1 * | 4/2004 | Aoki | 349/65 |

FOREIGN PATENT DOCUMENTS

| | | | |
|---|---|---|---|
| JP | 11142841 A | * | 5/1999 |
| JP | 2000315414 A | * | 11/2000 |
| JP | 2001338512 A | * | 12/2001 |
| KR | 10-2000-0009872 | | 2/2000 |
| KR | 10-2000-0055000 | | 9/2000 |
| KR | 10-2001-0039944 | | 5/2001 |

* cited by examiner

*Primary Examiner* — Wen-Ying P Chen
(74) *Attorney, Agent, or Firm* — Morgan, Lewis & Bockius LLP

(57) ABSTRACT

A liquid crystal display device includes a liquid crystal display panel, a backlight unit having a fluorescent lamp, a reflection sheet reflecting light emitted from the fluorescent lamp, and a bottom cover supporting the reflection sheet, and a metal chassis supporting and affixing the liquid crystal display panel and the backlight unit.

10 Claims, 5 Drawing Sheets

BACKLIGHT UNIT AND LIQUID CRYSTAL DISPLAY DEVICE USING THE SAME

The present application claims the benefit of Korean Patent Application No. P2003-027784 filed in Korea on Apr. 30, 2003, which is hereby incorporated by reference.

BACKGROUND OF THE INVENTION

1. Field of the Invention

The present invention relates to a display device, and more particularly, to a liquid crystal display device having a backlight unit.

2. Background of the Related Art

Presently, display devices serve as very important visual information transfer mediums, and can be categorized into different types, such as luminescent types that include cathode ray tube (CRT) devices, electro-luminescent (EL) displays, light emitting diode (LED) devices, vacuum fluorescent display (VFD) devices, field emission display (FED) devices, and plasma display panel (PDP) devices, and non-luminescent types that require separate luminescent units to produce light, such as liquid crystal display (LCD) devices. The liquid crystal display (LCD) devices display images by making use of optical anisotropy of liquid crystals. In the LCD devices, the liquid crystals do not emit light, but receive, modulate, and transmit light onto a display panel. Accordingly, the liquid crystals require a light source, i.e., a backlight unit, to irradiate light onto a liquid crystal display panel.

FIG. 1 is a perspective assembly view of a liquid crystal display device according to the related art, and FIG. 2 is a perspective view of the liquid crystal display device of FIG. 1 according to the related art. In FIGS. 1 and 2, a liquid crystal display device consists of a liquid crystal display panel 10 for providing an image, a backlight unit 20 installed along a back of the liquid crystal display panel 10 to emit light along an entire front of the liquid crystal display panel 10, and a rectangular frame type metal chassis 30 supporting and affix each corner of the liquid crystal display panel 10 to the backlight unit 20. The liquid crystal display panel 10 includes an array substrate 11, a color filter substrate 12, liquid crystals (not shown) injected between the array and color filter substrates 11 and 12, and a driving circuit unit 13.

The backlight unit 20 functions to provide planar light having a uniform brightness from a fluorescent lamp 43. Accordingly, a thickness and power consumption of the liquid crystal display device is dependent upon how thin the profile of the backlight unit 20 is and how efficiently light is used. The backlight unit 20 includes a lamp assembly 45 having the fluorescent lamp 43 therein, a reflection sheet 21 that reflects light emitted from the fluorescent lamp 43 thereupon, a light guide plate 22 that guides the light, a plurality of optical sheets 23 installed on an upper surface of the light guide plate 22 to diffuse and condense the light transferred from the light guide plate 22, a mold frame 24 sequentially stacking to receive the reflection sheet 21, the light guide plate 22, the optical sheets 23, and the lamp assembly 45 therein, and a bottom cover 25.

The mold frame 24 is made of a plastic-based material and includes a reception space having a predetermined depth and a continuous step sill over a surface bent toward the reception space. The mold frame 24 encloses edges of the light guide plate 22 and lamp assembly 45 stacked within the reception space. In addition, the optical sheets 23 and the liquid crystal display panel 10 are sequentially received on the step sill over the surface of the mold frame 24, thereby providing overall support for the liquid crystal display device.

The lamp assembly 45 includes the fluorescent lamp 43, lamp holders (not shown) that are inserted in both ends of the fluorescent lamp 43, a lamp cover 44 enclosing an outer circumference of the fluorescent lamp 43 to improve light efficiency by reflecting the light emitted from the fluorescent lamp 43 toward the light guide plate 22, and wires (not shown) for transferring power to the fluorescent lamp 43.

The lamp cover 44 is made of a metal based material, and its inner surface is coated with silver (Ag) or covered with a silver (Ag) sheet to function as a reflector. The lamp cover 44 is made using a complex-processed expensive material, thereby increasing product costs of the liquid crystal display device. Furthermore, small impacts will deform the lamp cover 44, unless the lamp cover 44 is fully enclosed by the mold frame 24. However, this complicates assembly of the liquid crystal display device. In addition, light unnecessarily leaks out through a gap between the deformed portion of the lamp cover 44 and the optical sheets 23 or reflection sheet 21, thereby degrading image quality of the liquid crystal display device. Moreover, the gap increases as the device is subjected to additional impacts, thereby increasing the light leakage.

In order to prevent the light leakage, a black shield is formed along edges of the optical sheets 23, which corresponds to an end of a path of the light leakage, or a pad may be formed to extinguish the light. However, a method of forming the shield on an upper diffusion sheet (not shown) of the optical sheets 23 to prevent the light leakage complicates the sheet preparing process. In addition, a method of forming the pad complicates the assembly process of the liquid crystal display device and increases an overall thickness of the liquid crystal display device.

SUMMARY OF THE INVENTION

Accordingly, the present invention is directed to a liquid crystal display device that substantially obviates one or more problems due to limitations and disadvantages of the related art.

An object of the present invention is to provide a liquid crystal display device that prevents light leakage without complicating a method of fabricating the liquid crystal display device.

Another object of the present invention is to provide a liquid crystal display device that reduces production costs.

Additional features and advantage of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a liquid crystal display panel, a backlight unit having a fluorescent lamp, a reflection sheet reflecting light emitted from the fluorescent lamp, and a bottom cover supporting the reflection sheet, and a metal chassis supporting and affixing the liquid crystal display panel and the backlight unit.

In another aspect, a backlight unit includes a panel-type light guide plate having a light projection plane and an light incident plane, a reflection plate along a rear side of the light guide plate, a lamp assembly at the incident light plane of the light guide plate, the lamp assembly including the fluorescent lamp and a reflection sheet at an outer side of fluorescent lamp, a plurality of optical sheets over the light projection plane of the light guide plate, a rectangular mold frame receiving the reflection plate, the light guide plate, the plurality of optical sheets, and the lamp assembly therein, and a bottom cover extending from a bottom of the mold frame to an outer side of the reflection sheet, wherein the reflection sheet has a round shape and end portions of the reflection sheet overlap a portion of the light guide plate by a first overlap amount within a range of about 0.2 mm to about 30 mm and a space between an end portion of the bottom cover and the light guide plate is within a range of about 0.1 mm to about 50 mm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
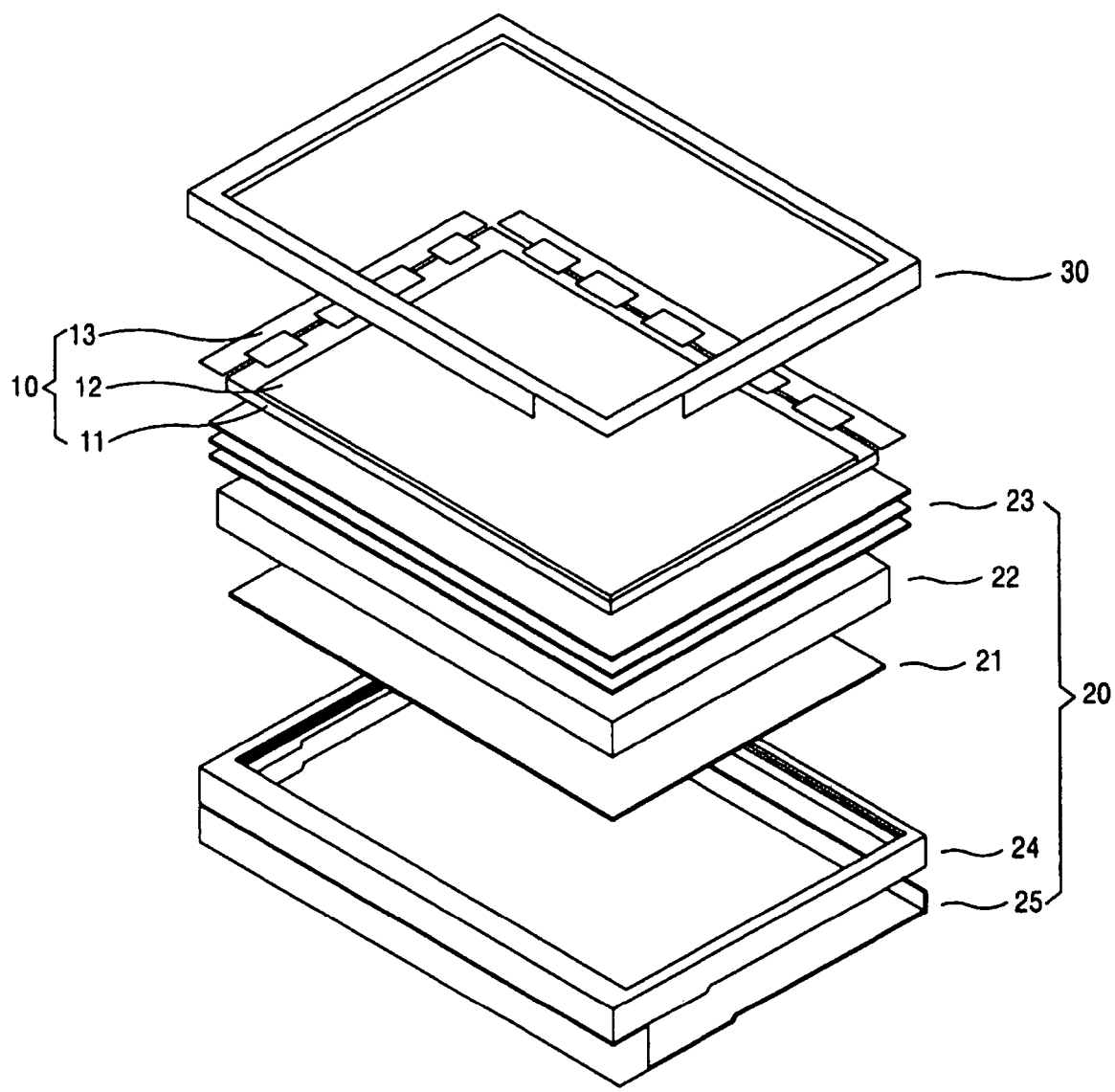
FIG. 1 is a perspective assembly view of a liquid crystal display device according to the related art.
Figure 2:
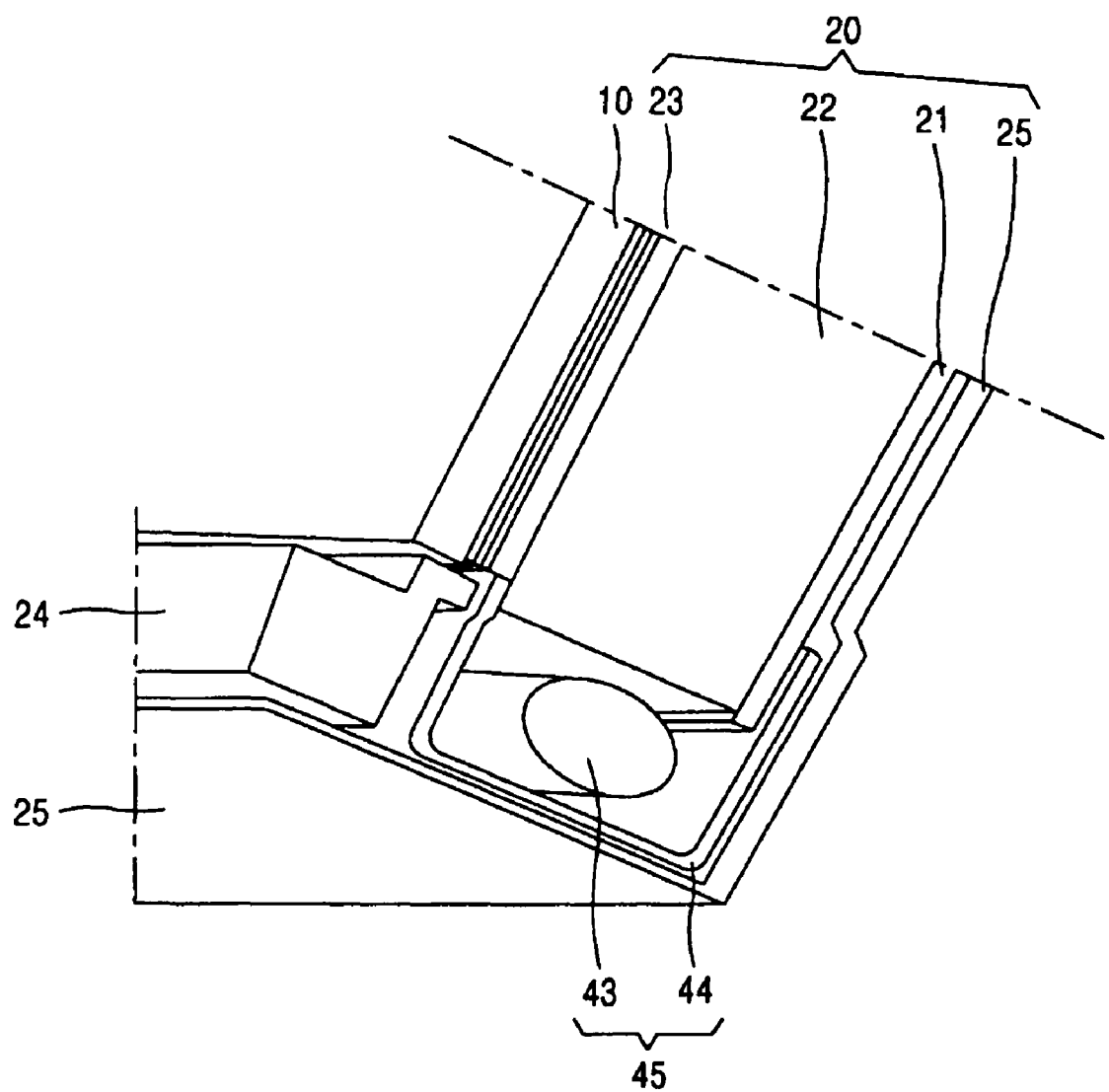
FIG. 2 is a perspective view of the liquid crystal display device of FIG. 1 according to the related art.
Figure 3A:
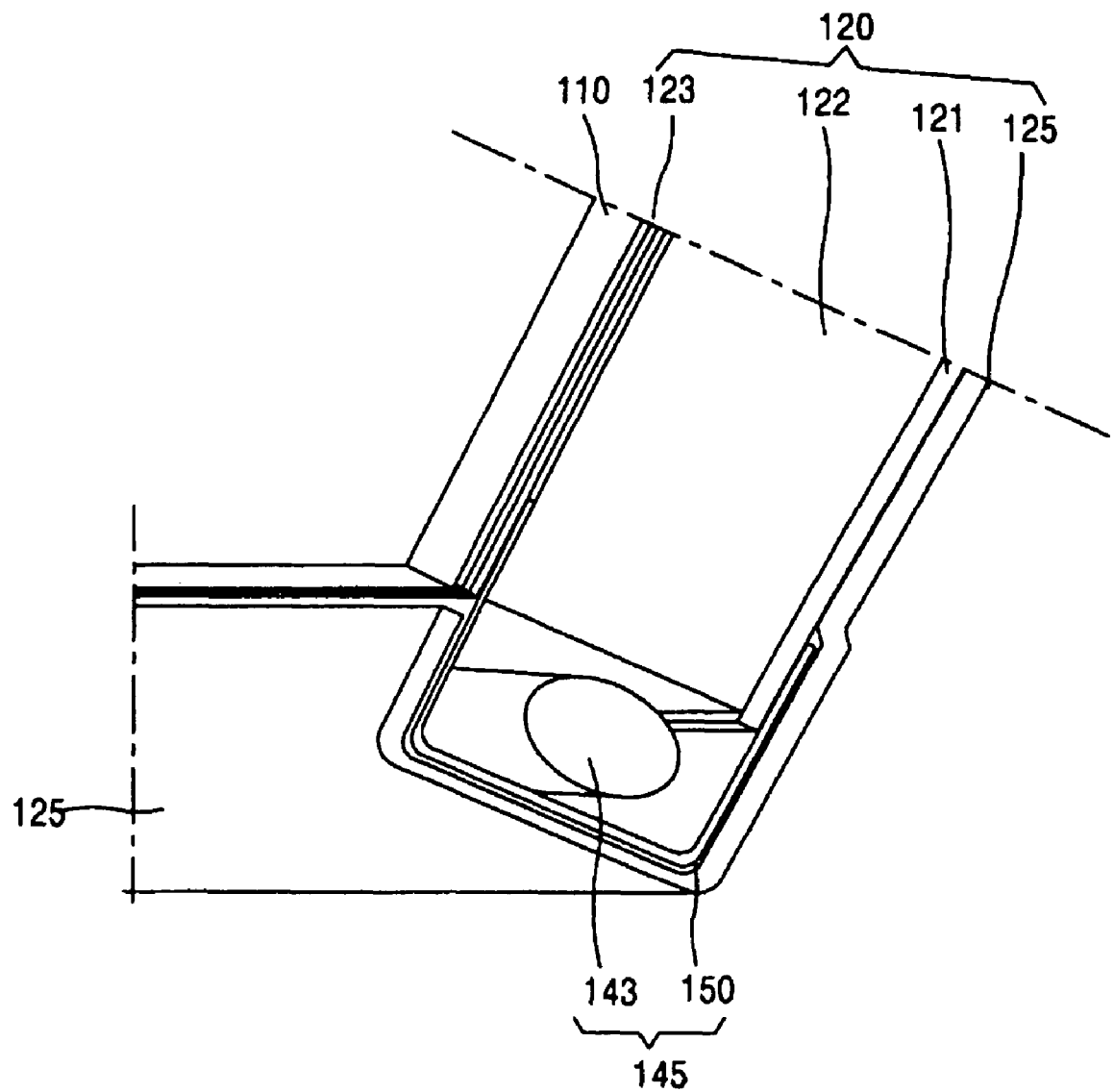
FIG. 3A is a partial perspective view of an exemplary liquid crystal display device according to the present invention.
Figure 3B:
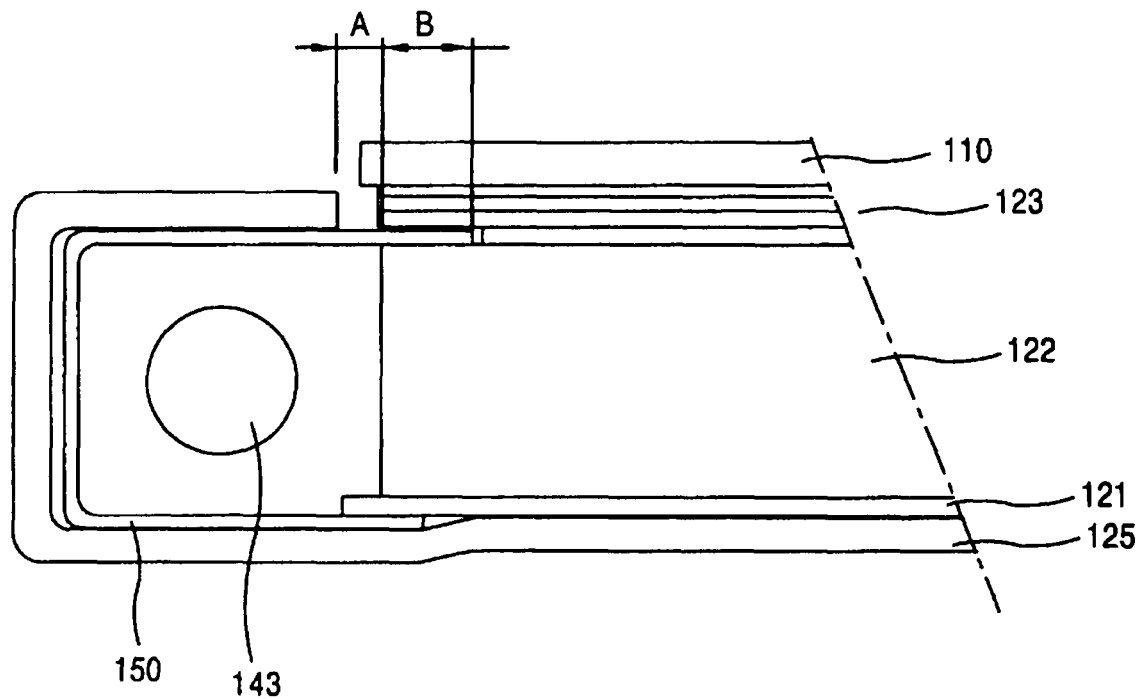
FIG. 3B is a cross sectional view of the exemplary liquid crystal display device shown of FIG. 3A according to the present invention.

FIG. 3A is a partial perspective view of an exemplary liquid crystal display device according to the present invention, and FIG. 3B is a cross sectional view of the exemplary liquid crystal display device shown of FIG. 3A according to the present invention. In FIGS. 3A and 3B, a liquid crystal display device may include a liquid crystal display panel 110 functioning to output images, a backlight unit 120 that may be installed along a back portion of the liquid crystal display panel 110 to emit light along an entire front portion of the liquid crystal display panel 110, and a metal chassis (not shown) that may receive and affix the backlight unit 120 to the liquid crystal display panel 110.

The backlight unit 120 may include a lamp assembly 145 having a fluorescent lamp 143 therein, a reflection plate 121 that may reflect light emitted from the fluorescent lamp 143 thereon, a light guide plate 122 that may guide the light, a plurality of optical sheets 123 positioned along an upper surface of the light guide plate 122 to diffuse the light transferred from the light guide plate 122 as well as condense the light, a mold frame (not shown) sequentially stacking to receive the reflection plate 121, a light guide plate 122, a plurality of optical sheets 123, a lamp assembly 145 therein, and a bottom cover 125 to enclose and support an outer side of a reflection sheet 150.

The lamp assembly 145 includes the fluorescent lamp 143 emitting light, a plurality of lamp holders (not shown) that may be inserted and affixed at ends of the fluorescent lamp 143, and a reflection sheet 150 that may enclose an outer side of the fluorescent lamp 143 to improve light efficiency by reflecting the light emitted from the fluorescent lamp 143 toward the light guide plate 122.

A cold cathode fluorescent lamp (CCFL) having a small size and high brightness may be used as the fluorescent lamp 143. Accordingly, a fluorescent substance of the CCFL may include rare earth material, such as Y, Ce, and Tb, wherein three different wavelengths of light, such as red, green, and blue, may be used to produce white light. Thus, the backlight unit 120 using the CCFL may have relatively low power consumption and may provide relatively large amounts of the white light.

The reflection plate 121 may be prepared using a mixed material containing an acrylic binder and pigment, which may have no optical absorption and may have a high reflexibility. For example, TiO2 and BaSO4 may be coated on a base material to form a gradation pattern. Specifically, the mixed material may be coated on the base material with the gradation pattern so that a first portion of the reflection plate 121 disposed at a position closer to the fluorescent lamp 143 may have a first pattern smaller than a second pattern of a second portion of the reflection plate 121 disposed at a position distant from the fluorescent lamp 143. Accordingly, the reflection plate 121 may reduce incident light loss on the liquid crystal display panel 110, and may improve uniformity of the light transmitted to a projection plane of the light guide plate 122.

The light guide plate 122 may form a panel shape having the projection plane in parallel with a tilted rear plane, or a rear plane may be in parallel with tilted projection plane, and may guide the light generated from the fluorescent lamp 143 toward the liquid crystal display panel 110 thereon through the projection plane of the light guide plate 122. Accordingly, diffusion ink (not shown) may be printed as a fine dot pattern on a rear plane of the light guide plate 122 to guide the light generated from the fluorescent lamp 143 progress toward the liquid crystal display panel 110.

The plurality of optical sheets 123 may improve viewing angles of the liquid crystal display device. In addition, the plurality of optical sheets 123 may improve a brightness of the light guided to the projection plane of the light guide plate 122.

The reflection sheet 150 may be formed of synthetic resin, such as alkylbenzene sulfonate (ABS), polyethylene terephthalate (PET), and polyvinyl chloride (PVC), or may be formed of a non-metallic substance. In order to prevent the reflection sheet 150 from turning brown due to extended heat absorption around the fluorescent lamp 143, Ti (titanium) or a polymer having high reflexibility may be used for the reflection sheet 150. The reflection sheet 150 encloses most portions of the fluorescent lamp 143 except for a light exit portion having a round shape and may be affixed to both sides of the light guide plate 122. Accordingly, the reflection sheet 150 may be affixed to both sides of the light guide plate 122 to overlap with a portion of the light guide plate 122 to prevent deformation of the reflection sheet 150. For example, an overlap width B may be within a range of about 0.2 mm to about 30 mm between the reflection sheet 150 and light guide plate 122.

In FIGS. 3A and 3B, the bottom cover 125 may have a shape similar to a shape of the reflection sheet 150 to prevent deformation of the reflection sheet 150. In addition, the bottom cover 125 may be disposed along an outer side of the reflection sheet 150 to support and affix the reflection sheet 150. Accordingly, light leakage may be prevented from occurring within a gap between the reflection sheet 150 and the optical sheets 123 or between the reflection sheet 150 and the reflection plate 121.

In FIG. 3B, the bottom cover 125 may be positioned to leave a predetermined interval A from the light guide plate 122 to simplify assembly of the light guide plate 122. For example, the predetermined interval A may be within a range of about 0.1 mm to about 50 mm.

According to the present invention, the reflection sheet 150 enclosing the fluorescent lamp 143 reflects the light emitted from the fluorescent lamp 143 toward the light guide plate 122, and the light guide plate 122 guides the light to the liquid crystal display panel 110 to display an image. Since the reflection sheet 150 may function similarly to the reflection plate 121, both the reflection sheet 150 and the reflection plate 121 may be formed of a same material.

Figure 4:
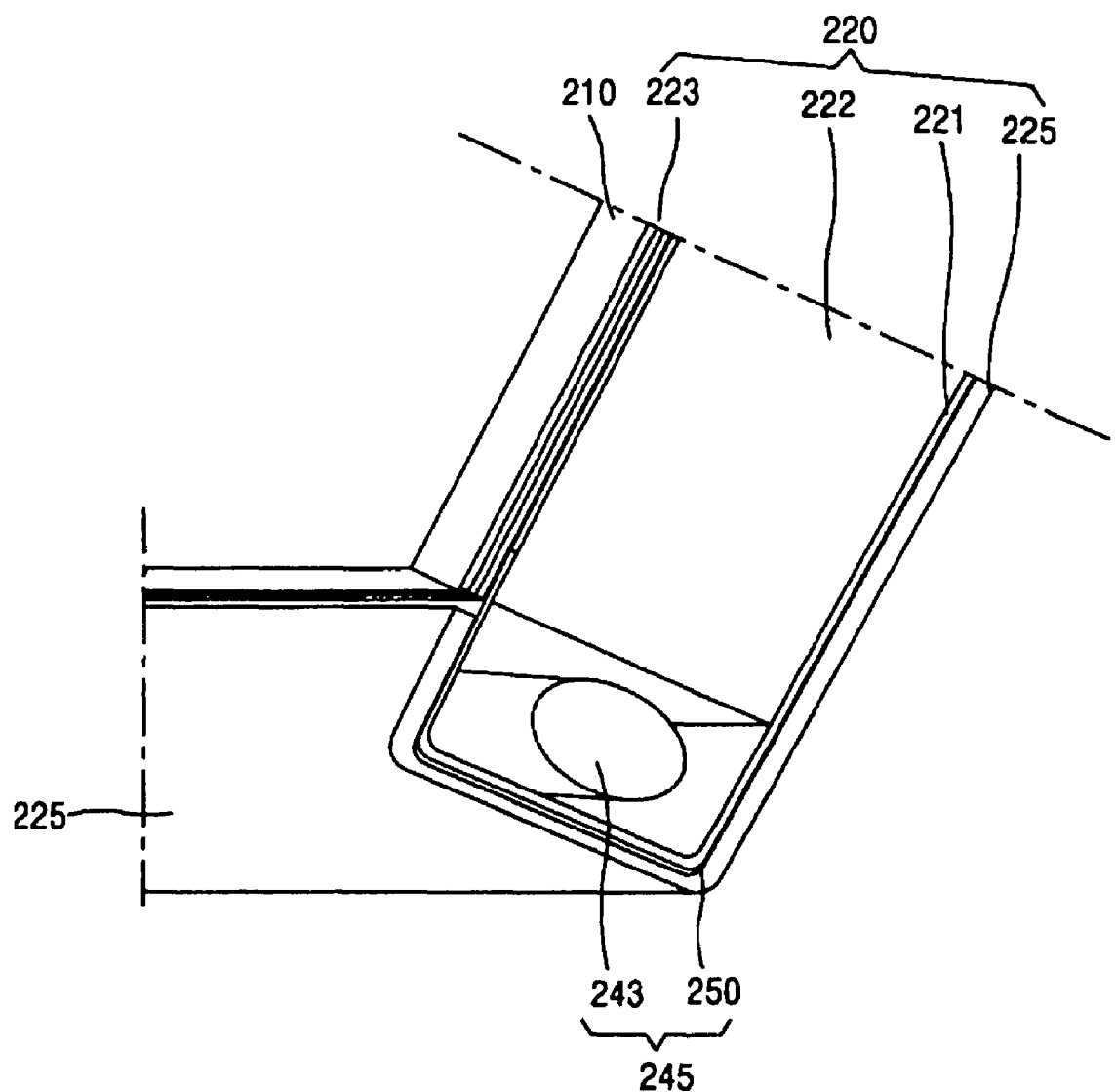
FIG. 4 is a partial perspective view of another exemplary liquid crystal display device according to the present invention.

FIG. 4 is a partial perspective view of another exemplary liquid crystal display device according to the present invention. In FIG. 4, similar features of the exemplary liquid crystal display device of FIG. 3 may be included except for formation of a reflection sheet. In FIG. 4, a liquid crystal display device may include a liquid crystal display panel 210, a backlight unit 220 may be disposed along a back portion of the liquid crystal display panel 210 to emit light along an entire front of the liquid crystal display panel 210, and a metal chassis (not shown) for receiving and affixing the backlight unit 220 and liquid crystal display panel 210.

The backlight unit 220 may include a lamp assembly 245 having a fluorescent lamp 243 therein, a reflection plate 221 that may reflect light emitted from the fluorescent lamp 243 thereon, a light guide plate 222 that may guide the light, a plurality of optical sheets 223 may be disposed along an upper surface of the light guide plate 222 to diffuse and condense the light transferred from the light guide plate 222, a mold frame (not shown) may sequentially stack and receive the reflection plate 221, the light guide plate 222, the plurality of optical sheets 223, and the lamp assembly 245 therein, and a bottom cover 225 that may enclose and support an outer side of a reflection sheet 250.

In FIG. 4, extending the reflection plate 221 under the light guide plate 222 may form the reflection sheet 250 to enclose an outer side of the fluorescent lamp 243. Moreover, the reflection sheet 250 may be formed of a same material as the reflection plate 221. Accordingly, during fabrication of the backlight unit according to the present invention, the reflection sheet 250 and the reflection plate 221 may be fabricated using a same step, thereby simplifying the fabricating process. In addition, since the reflection sheet 250 and the reflection plate 221 may be formed of the same material, production costs may be reduced.

According to the present invention, preventing the light leakage may be accomplished by modifying the backlight unit without increasing or complicating the fabrication process. Specifically, the reflection sheet 250 may overlap the light guide plate 222, and the bottom cover 225 may support and affix the reflection sheet 250, thereby preventing formation of any gaps between edges of the reflection sheet 250, the reflection plate 221, and the plurality of optical sheets 223. Thus, light leakage may be prevented such that the light emitted from the fluorescent lamp may not leak outside without passing through the plurality of optical sheets 223. Accordingly, image quality of the liquid crystal display device may be improved.

According to the present invention, an overall thickness of the liquid crystal display device may be reduced. In addition, the synthetic resin based reflection sheet 250 may include a synthetic resin-based material having excellent reflexibility, production costs may be reduced.

It will be apparent to those skilled in the art that various modifications and variations may be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a liquid crystal display panel;
a light guide plate having a projection plane in parallel with a rear plane and a light incident plane;
a reflection plate along the rear plane of the light guide plate;
a fluorescent lamp along the light incident plane of the light guide plate;
a reflection sheet having opposed first and second end portions and substantially enclosing an outer side of fluorescent lamp except for a light exit portion,
wherein the reflection sheet is formed of a synthetic resin, and
wherein the second end portion of the reflection sheet overlaps the reflection plate and the rear plane of the light guide plate;
optical sheets over the projection plane of the light guide plate and overlapping the first end portion of the reflection sheet by an overlap amount (B);
a bottom cover extending from a rear side of the reflection plate to an outer side of the reflection sheet such that an end portion of the bottom cover extends to the outer side of the reflection sheet substantially following a contour of the reflection sheet to substantially surround and contact all the outer side of the reflection sheet except for a predetermined interval (A) from the light guide plate and the overlap amount (B),
wherein the end portion of the bottom cover is positioned to leave the same predetermined interval (A) from the optical sheets, and the first end portion of the reflection sheet overlaps the light guide plate by the same overlap amount (B); and
a chassis supporting and affixing the liquid crystal display panel and the bottom cover.

2. The device according to claim 1, further comprising:
a rectangular mold frame receiving the reflection plate, the light guide plate, and the optical sheets therein.

3. The device according to claim 1, wherein the predetermined interval (A) is within a range of about 0.1 mm to about 50 mm.

4. The device according to claim 1, wherein the overlap amount (B) is within a range of about 0.2 mm to about 30 mm.

5. The device according to claim 1, wherein the reflection sheet is formed of one of a synthetic resin selected from the group consisting of alkylbenzene sulfonate (ABS), polyethylene terephthalate (PET), and polyvinyl chloride (PVC), and a non-metallic substance.

6. The device according to claim 5, wherein the synthetic resin includes one of a polymer having a high reflexibility and Ti.

7. A backlight unit, comprising:
a light guide plate having a projection plane in parallel with a rear plane and a light incident plane;
a reflection plate along the rear plane of the light guide plate;
a fluorescent lamp along the light incident plane of the light guide plate;

a reflection sheet having opposed first and second end portions and substantially enclosing an outer side of fluorescent lamp except for a light exit portion, wherein the reflection sheet is formed of a synthetic resin, and wherein the second end portion of the reflection sheet overlaps the reflection plate and the rear plane of the light guide plate;

optical sheets over the light projection plane of the light guide plate and overlapping the first end portion of the reflection sheet by an overlap amount (B); and a bottom cover extending from a rear side of the reflection plate to an outer side of the reflection sheet such that an end portion of the bottom cover extends to the outer side of the reflection sheet substantially following a contour of the reflection sheet to substantially surround and contact all the outer side of the reflection sheet except for a predetermined interval (A) from the light guide plate and the overlap amount (B), wherein the end portion of the bottom cover is positioned to leave the same predetermined interval (A) from the optical sheets, and the first end portion of the reflection sheet overlaps the light guide plate by the same overlap amount (B).

8. The backlight unit according to claim 7, wherein the reflection sheet is formed of one of a synthetic resin selected from the group consisting of alkylbenzene sulfonate (ABS), polyethylene terephthalate (PET), and polyvinyl chloride (PVC), and a non-metallic substance.

9. The backlight unit according to claim 8, wherein the synthetic resin includes one of a polymer having a high reflexibility and Ti.

10. The backlight unit according to claim 7, wherein the predetermined interval (A) is within a range of about 0.1 mm to about 50 mm and the overlap amount (B) is within a range of about 0.2 mm to about 30 mm.

* * * * *